Feb. 7, 1928.
J. L. HOPKINS
1,658,165
VENT FORMING HOLDER FOR CANS
Filed July 14, 1926
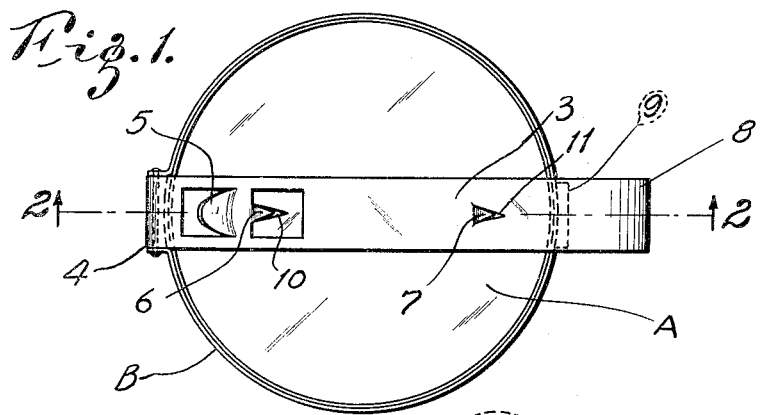
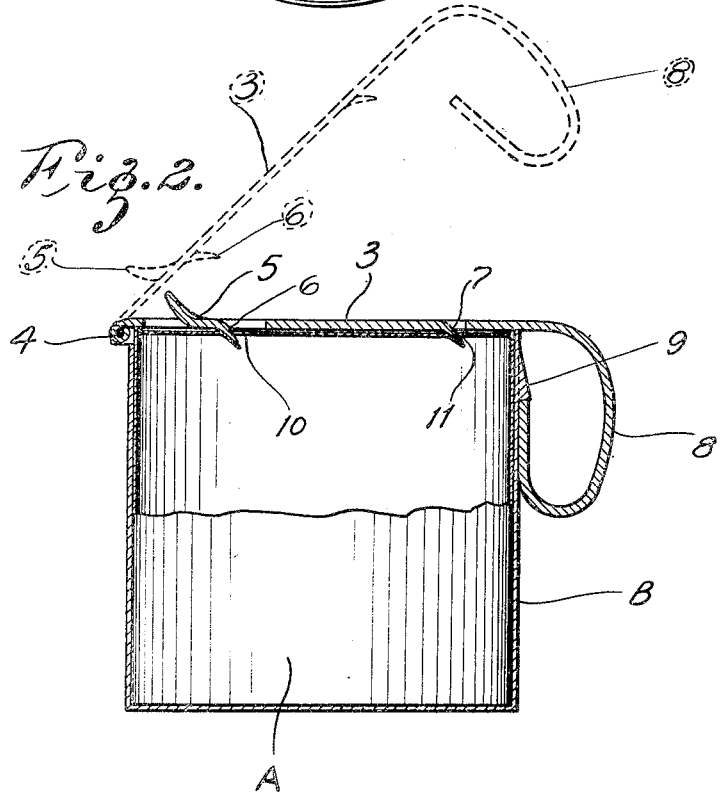
INVENTOR:-
JAMES L. HOPKINS.
BY
ATTORNEY.

Patented Feb. 7, 1928.

1,658,165

UNITED STATES PATENT OFFICE.

JAMES L. HOPKINS, OF ST. LOUIS, MISSOURI.

VENT-FORMING HOLDER FOR CANS.

Application filed July 14, 1926. Serial No. 122,300.

My invention relates to a vent-forming holder for cans, and particularly is adapted for use with hermetically sealed cans of liquid food products, such as condensed milk, olive oil, molasses and the like.

Primarily, the device of my invention comprises an open top receptacle of a size to properly receive and hold the can, and a lever hinged at the top of said receptacle and provided with prongs, the prongs being so disposed as to so puncture the top of the can, when the lever is forced into contact with the top of the can, as to provide a pouring vent and an air-vent.

The device of my invention may also provide a pouring-lip in proximity to the pouring-vent, and a handle carried by the lever and arranged to lock the lever in place upon the can when the vents have been formed.

The ultimate object of my invention is to provide a holder to receive the can of liquid, properly puncture the top of the can to form a pouring-vent and an air-vent, and having a handle for convenience in the operation of pouring out the can contents in kitchen or table use, when it is desired that the can remain in its holder until the can-content has been exhausted. Otherwise, the can may be removed from the holder as soon as the puncturing operation has been performed.

Drawings.

In the drawings:

Fig. 1 is a top plan view of a structure embodying my invention, with a can in place.

Fig. 2 is a vertical mid-sectional view of the same taken on the line 2—2 of Fig. 1.

Description.

In the drawings the can A is the usual sealed can of condensed milk or the like. The holder B is a receptacle for the can A and has an open top for the ready reception of the can A. The lever 3 is hinged at 4 to one side and at the upper edge of the holder B, and is provided with a pouring spout 5, a downwardly projecting prong 6, a like prong 7 and a terminal looped handle 8. In alinement with the handle 8, the holder B has a projecting catch 9, with which the inner end handle 8 will be engaged when the lever 3 is in locked position as shown in Fig. 2.

As shown in Fig. 2, the prongs 6 and 7 are fixed at such an acute angle to the plane of the bottom of the lever 3 as to rip or tear the top of the can A in the two places desired during the downward movement of the lever 3, forming the pouring vent 10 and air-vent 11 and forcing the torn fragments downwardly beneath the level of the top of the can A.

Mode of operation.

The can A is first placed in the holder B, the lever 3 being in opened position as shown by dotted lines in Fig. 2. The operator will then grasp the handle 8 and pull it downward into horizontal and locked position, the inner end of the handle 8 engaging with the catch 9; during which downward movement of the lever 3 the prongs 6 and 7 tear or puncture the top of the can A, forming respectively a pouring-vent 10 and an air-vent 11. The structure is then ready for kitchen or table use, and when the contents of the can A have been completely poured out, the can A will be released from the holder B by disengaging the handle 8 from the catch 9 and raising the lever 3.

I have illustrated my preferred form of the lever 3, which may obviously be shaped if desired to form a lid completely covering the holder B, and other variations of form may be effected without departure from my actual invention as defined in the appended claim.

I claim:

A can holder comprising an open top receptacle having a lug adjacent the open top thereof, a member hinged at one end to the receptacle adjacent the open top thereof to be positioned across the open top and having a downwardly and upwardly bent portion adjacent its free end forming a handle, the upwardly bent portion lying against the side of the receptacle to engage the free end beneath the lug to retain the member in position across the open top, and said member provided with a pair of instruck prongs forming means whereby the cover of a can carried within the receptacle is punctured, and an outstruck lip adjacent one of said instruck prongs forming a pouring spout for the contents of the can.

In testimony whereof I have hereunto affixed my signature.

JAMES L. HOPKINS.